United States Patent [19]

Inuiya

[11] Patent Number: 5,640,201
[45] Date of Patent: Jun. 17, 1997

[54] FILM CARTRIDGE AND FILM IMAGE INPUT SYSTEM THEREOF

[75] Inventor: Masafumi Inuiya, Asaka, Japan

[73] Assignee: Fuji Photo Film Co., Ltd., Kanagawa, Japan

[21] Appl. No.: 419,984

[22] Filed: Apr. 11, 1995

[30] Foreign Application Priority Data

Apr. 15, 1994 [JP] Japan ................... 6-077224

[51] Int. Cl.$^6$ ................ H04N 9/04; H04N 5/91; G03B 17/24; G03C 3/00
[52] U.S. Cl. ................ 348/98; 348/96; 348/101; 386/128; 396/311
[58] Field of Search ................ 355/32, 40, 50, 355/75; 354/105, 106, 107, 108, 109; 348/243, 257, 223, 674, 96, 97, 98, 101; 386/42, 128, 129, 130; G03B 17/24

[56] References Cited

U.S. PATENT DOCUMENTS

| | | | |
|---|---|---|---|
| 4,338,644 | 7/1982 | Staar | 360/132 |
| 4,418,358 | 11/1983 | Poetsch et al. | 358/80 |
| 5,040,068 | 8/1991 | Parulski et al. | 358/209 |
| 5,142,310 | 8/1992 | Taniguchi et al. | 354/106 |
| 5,579,131 | 11/1996 | Kusumoto et al. | 358/518 |

FOREIGN PATENT DOCUMENTS

| | | |
|---|---|---|
| 2-217829 | 8/1990 | Japan . |
| 4-85532 | 3/1992 | Japan . |
| 4-107074 | 4/1992 | Japan . |
| 4-107082 | 4/1992 | Japan . |
| 4-107083 | 4/1992 | Japan . |
| 4-130397 | 5/1992 | Japan . |

*Primary Examiner*—Tommy P. Chin
*Assistant Examiner*—David Vincent
*Attorney, Agent, or Firm*—Sughrue, Mion, Zinn, Macpeak & Seas

[57] ABSTRACT

A film cartridge which can be looked up easily and a film image input system which can obtain a high quality image by using the film cartridge wherein the image signal of each frame image, of which the image quality is adjusted, is recorded in the EEPROM of the image record unit to be mounted on the film cartridge, in which the photo film is stored in a roll, so as to correspond to the frame number while the developed photo film is printed. And, the film image input system controls the adding circuit, the multiplying circuit and the gamma correction circuit based on the respective R, G, B color signals, which are respectively outputted to the black level controller, the white level controller and the gradation controller from the EEPROM, and outputs an image signal, which has the same gradation characteristics as that of the image signal which is recorded in the EEPROM, to the encoder. With this arrangement, a high-quality image can be obtained which is equal to a printed photograph on the TV monitor while the frame image is being reproduced.

3 Claims, 5 Drawing Sheets

FILM CARTRIDGE AND FILM IMAGE INPUT SYSTEM THEREOF

BACKGROUND OF THE INVENTION

1. Field of the Invention

The present invention relates to a film cartridge and a film image input system thereof, more particularly to a film cartridge wherein a photo film and an image record unit are stored and to a film image input system for reproducing the image of the photo film, which is stored in the film cartridge, on a TV monitor.

2. Description of the Related Art

Conventionally, a film cartridge is disclosed wherein an image record unit is mounted on a film cartridge in which a photo film is stored (Japan Patent Application Laid-Open No. 2-217829 and 4-85532). The information related to photographing is recorded in the image record unit while photographing. The image record unit is carried to a lab with the film cartridge after photographing, and then is removed from the film so as to read out the photographing information. Then, the image record unit, which has been read completely, is removed to the developed film cartridge, and an user can confirm the read-out photographing information when printed photographs and the film cartridge are returned.

And, a film image input system is disclosed in which a photo film is imaged by the imaging means and displayed on the TV monitor (Japan Patent Application Laid-Open No. 4-107082). In this film image input system, the respective maximum and minimum values of the R, G, B image signals of the imaged frame image are detected, and variable gain amplifying circuits and level adjusting circuits (clamp circuits), which are provided by two kinds of color signals, are adjusted in so that the maximum values and the minimum values of the respective R, G, B color signals become equal to each other, whereby the white balance and the black balance are adjusted. And, the film image input system described in Japan Patent Application Laid-Open No. 4-107082 is provided with gamma correction circuits for making gradation characteristics of the respective R, G, B color signals even by the respective color signal.

However, in the conventional film cartridge with the image record unit in which photographing information is recorded, though the photographing information is read out and displayed, the photo film in the film cartridge can not be confirmed when is taken, therefore, there is a disadvantage in that it takes time to look up a film cartridge when the number of the film cartridges increases.

Further, in the conventional film image input system, the signals are merely processed for the respective levels of the R, G, B color signals which are imaged by the imaging means, therefore, there is another disadvantage in that a high-quality image can not be obtained which is equal to a printed photograph.

SUMMARY OF THE INVENTION

The present invention has been developed to eliminate the above-described disadvantage and has as its aim the provision of a film cartridge which can be looked up easily and a film image input system which can obtain a high quality image.

To achieve the above-described object, a film cartridge for storing a photo film of a long band in a roll and mounted with an image record unit, wherein a image signal of each frame image, of which a image quality is adjusted while said photo film which is developed is printed, is recorded in said image record unit so as to correspond to a frame number.

To achieve the above-described object, a film cartridge for storing a photo film of a long band in a roll and mounted with an image record unit, wherein: said image record unit is formed in a horseshoe-shaped plate and plural electrode plates are provided on a surface thereof; a storage part for said image record unit and plural hole parts for contact pins are formed at one end face of a main body case of said film cartridge; and, when said image record unit is stored in said storage part of said film cartridge, said image record unit is positioned at that a spool axis of said film cartridge is held by a concave portion of a horseshoe shape of said image record unit and said electrode plate of said image record unit is exposed at said hole parts for contact pins.

To achieve the above-described object, a film image input system employing a film cartridge in which a photo film of a long band is stored in a roll and an image record unit is mounted, and a image signal of each frame image, of which a image quality is adjusted while a developed photo film is printed, is recorded in said image record unit so as to correspond to a frame number; said film image input system comprising: film conveyance means for rewinding said developed photo film from a film cartridge and conveying; a light source for illuminating said photo film which is conveyed by said film conveyance means; imaging means for imaging a transmitted image of a frame in said photo film which is illuminated by said light source; adding means for adding respective red, green and blue offset values to red, green and blue signals which are outputted from said imaging means; multiplying means for multiplying respective red, green and blue gain values by respective red, green and blue signals which are outputted from said adding means; gamma correction means for gamma correcting said respective red, green and blue signals which are outputted from said multiplying means; image signal selecting means for selecting and outputting an image signal of said frame which is recorded in said image record unit in corresponding to a frame number of a frame, which is imaged by said imaging means; a black level controller for detecting reference minimum values of respective red, green and blue signals based on an image signal selected by said image signal selecting means and minimum values of respective red, green and blue signals based on said respective red, green and blue signals which are outputted from said gamma correction means, and for outputting offset values to said adding means so as to correspond said minimum values to said reference minimum values; a white level controller for detecting reference maximum values of respective red, green and blue signals based on an image signal selected by said image signal selecting means and maximum values of respective red, green and blue signals based on said respective red, green and blue signals which are outputted from said gamma correction means, and for outputting gain values to said multiplying means so as to correspond said maximum values to said reference maximum values; and, a gradation controller for detecting reference medium values of respective red, green and blue signals based on an image signal selected by said image signal selecting means and medium values of respective red, green and blue signals based on said respective red, green and blue signals which are outputted from said gamma correction means, and for making said gamma correction means gamma-correct so as to correspond said medium values to said reference medium values.

To achieve the above-described object, a film image input system employing a film cartridge in which a photo film of a long band is stored in a roll and an image record unit is mounted, and a reference minimum value, a maximum value and a reference medium value for respective red, green and blue signals of each frame image, of which a image quality is adjusted while a developed photo film is printed, are recorded; said film image input system comprising: film conveyance means for rewinding said developed photo film from a film cartridge and conveying; a light source for illuminating said photo film which is conveyed by said film conveyance means; imaging means for imaging a transmitted image of a frame in said photo film which is illuminated by said light source; adding means for adding respective red, green and blue offset values to red, green and blue signals which are outputted from said imaging means; multiplying means for multiplying respective red, green and blue gain values by respective red, green and blue signals which are outputted from said adding means; gamma correction means for gamma correcting said respective red, green and blue signals which are outputted from said multiplying means; image signal selecting means for selecting and outputting a reference minimum value, a reference maximum value and a reference medium value which are recorded in said image record unit in corresponding to a frame number of a frame, which is imaged by said imaging means; a black level controller for detecting minimum values of respective red, green and blue signals based on an image signal outputted from said respective red, green and blue signals, and for outputting offset values to said adding means so as to correspond said minimum values to said reference minimum values of said respective red, green and blue signals, which are selected by said image signal selecting means; a white level controller for detecting maximum values of respective red, green and blue signals based on said respective red, green and blue signals which are outputted from said gamma correction means, and for outputting gain values to said multiplying means so as to correspond said maximum values to said reference maximum values which are selected by said image signal selecting means; and, a gradation controller for detecting medium values of respective red, green and blue signals based on said respective red, green and blue signals which are outputted from said gamma correction means, and for making said gamma correction means gamma-correct so as to correspond said medium values to said reference medium values of said respective red, green and blue signals which are selected by said image signal selecting means.

According to the present invention, the image signal of each frame image, of which the image quality is adjusted while the photo film in the film cartridge is printed, is recorded in the image record unit to be mounted on the film cartridge so as to correspond to the frame number. With this arrangement, the image signal, which is recorded in the image record unit, is read and displayed, whereby the index image of the photo film stored in the film cartridge can be obtained, so that the film cartridge can be looked up easily. And, the image quality of the image signal is adjusted while the photo film is printed, therefore, an image can be obtained of a high quality equal to a printed photograph. And, the image signal is thinned out and/or compressed, and stored in the image record unit. Therefore, the record capacity of the image record unit can be reduced.

Further, the reference minimum values, the reference maximum values and the reference medium values of the respective R, G, B color signals of each frame, of which the image quality is adjusted while the developed photo film is printed, is recorded instead of the image signal. The reference minimum values, the reference maximum values and the reference medium values are used as reference values of the respective R, G, B color signals. That is, the signal is processed in a manner that the minimum values, the maximum values and the medium values of the respective R, G, B color signals correspond to the reference minimum values, the reference maximum values and the medium values, respectively, whereby an image can be obtained of a high quality equal to a printed photograph.

Moreover, the image record unit is formed in a horseshoe-shaped plate and plural electrode plates are provided on the surface thereof, and a storage part for the image record unit and plural hole parts for contact pins are formed at the one end face of the main body case of the film cartridge, then the image record unit is stored in the film cartridge storage part at the position that the spool axis of the film cartridge is held by the concave portion of the horseshoe-shaped image record unit and the electrode plates of the image record unit are exposed from the hole parts for the contact pins of the film cartridge. When the contact pins are put into the hole parts for contact pins, the electrode plate of the image record unit can be connected, so that the image record unit can be used without removing it from the film cartridge. Therefore, according to the film cartridge in this present invention, the image record unit can be kept from being lost.

According to the film image input system in this invention, the film cartridge in this invention is used and the image of the photo film in the film cartridge is reproduced. The photo film is rewound and conveyed from the film cartridge by the film conveyance means and illuminated by the light source, and the transmitted image is imaged by the imaging means. The respective R, G, B offset values are added to the respective R, G, B color signals of the frame image, which is outputted from the imaging means, by the adding means, and the respective R, G, B gain values is multiplied by the respective R, G, B color signals, which are outputted from the adding means, by the multiplying means, and the respective R, G, B color signals, which are outputted from the multiplying means, are gamma corrected by the gamma correction means.

On the other hand, the image signal selecting means selects the image signal, which is recorded in the image record unit so as to correspond to the frame number of the frame imaged by the imaging means, and outputs it to the black level controller, the white level controller and the gradation controller, respectively.

The black level controller detects the reference minimum values of the respective R, G, B color signals based on the image signal which is outputted from the image selecting means and the minimum values of the respective R, G, B color signals based on the respective R, G, B color signals which are outputted from the gamma correction means, and outputs the offset values in a manner that the minimum values correspond to the reference minimum values. Therefore, the respective color signals, of which the minimum values are equal to the reference minimum values, are outputted from the adding means to the multiplying means.

The white level controller detects the reference maximum values of the respective R, G, B color signals based on the image signal which is outputted from the image selecting means and the maximum values of the respective R, G, B color signals based on the respective R, G, B color signals which are outputted from the gamma correction means, and outputs the gain values in a manner that the maximum values correspond to the reference maximum values. Therefore, the respective color signals, of which the minimum values are equal to the reference minimum values, and the respective color signals, of which the maximum values are equal to the reference maximum values, are outputted from the multiplying means to the gamma correction means.

The gradation controller detects the reference medium values of the respective R, G, B color signals based on the image signal which is outputted from the image selecting means and the medium values of the respective R, G, B color signals based on the respective R, G, B color signals which are outputted from the gamma correction means, and the gamma correction means gamma-corrects in a manner that the medium values correspond to the reference medium values. Therefore, the gamma correction means outputs the same image signal as what is recorded in the image record unit. And, the outputted respective R, G, B color signals are image-processed and displayed, whereby an image can be obtained of a high quality equal to a printed photograph.

Further, the film image input system is provided with a switch for changing over the signal to be outputted to the TV monitor between the first signal outputted from the gamma correction means and the second signal outputted from the image signal selecting means. When the switch is changed to the second signal, the frame images of plural frames recorded in the image record unit are compressed and displayed on the TV monitor, so that the index image can be obtained. And, when the image of one frame is selected among the frame images of the plural frames which are compressed and displayed, the control means controls the film conveyance means so as to convey the frame, which corresponds to the selected frame image, to the taking position, and selects the image signal, which is recorded in the image record unit and corresponds to the frame image, with the image signal selecting means. With this arrangement, the frame image, which is selected by the image selecting means, can be displayed on the TV monitor.

Moreover, according to the film image input system in this invention, the image of the photo film in the film cartridge in this invention. The photo film is rewound and conveyed from the film cartridge by the film conveyance means, and is illuminated by the light source, and then the transmitted image of the frame is imaged by the imaging means. The respective R, G, B offset values are added to the respective R, G, B color signals, which are outputted from the imaging means, by the adding means, and the respective R, G, B color signals, which are outputted from the adding means, are multiplied by the respective R, G, B gain values with the multiplying means, and then the respective R, G, B color signals are gamma-corrected with the gamma correction means, respectively.

On the other hand, the image signal selecting means selects the image signal, which is recorded in the image record unit so as to correspond to the frame number of the frame imaged by the imaging means, and outputs it to the black level controller, the white level controller and the gradation controller, respectively.

The black level controller detects the minimum values of the respective R, G, B color signals based on the respective R, G, B color signals which are outputted from the gamma correction means, and outputs the offset values in a manner that the minimum values correspond to the reference minimum values of the respective R, G, B color signals which are outputted from the image signal selecting means. Therefore, the respective color signals, of which the minimum values are equal to the reference minimum values, are outputted from the adding means to the multiplying means.

The white level controller detects the maximum values of the respective R, G, B color signals based on the image signal which are outputted from the gamma correction means, and outputs the gain values in a manner that the maximum values correspond to the reference maximum values of the respective R, G, B color signals which are outputted from the image signal selecting means. Therefore, the respective color signals, of which the minimum values are equal to the reference minimum values, and the respective color signals, of which the maximum values are equal to the reference maximum values, are outputted from the multiplying means to the gamma correction means.

The gradation controller detects the medium values of the respective R, G, B color signals based on the respective R, G, B color signals which are outputted from the gamma correction means, and the gamma correction means gamma-corrects in a manner that the medium values correspond to the reference medium values. Therefore, the gamma correction means outputs the image signal, of which the minimum value, the maximum value and the medium value are equal to the reference minimum value, the reference maximum vales and the medium value recorded in the image record unit. And, the outputted respective R, G, B color signals are image-processed and displayed, whereby an image can be obtained of a high quality equal to a printed photograph.

BRIEF DESCRIPTION OF THE DRAWINGS

The exact nature of this invention, as well as other aims and advantages thereof, will be readily apparent from consideration of the following specification relating to the accompanied drawings, in which like reference characters designate the same or similar parts throughout the figures thereof and wherein.

DESCRIPTION OF THE PREFERRED EMBODIMENT

A detailed description will hereafter be given of the preferred embodiment of a film cartridge and a film image input system thereof according to the present invention with reference to the accompanying drawings.

Figure 1:
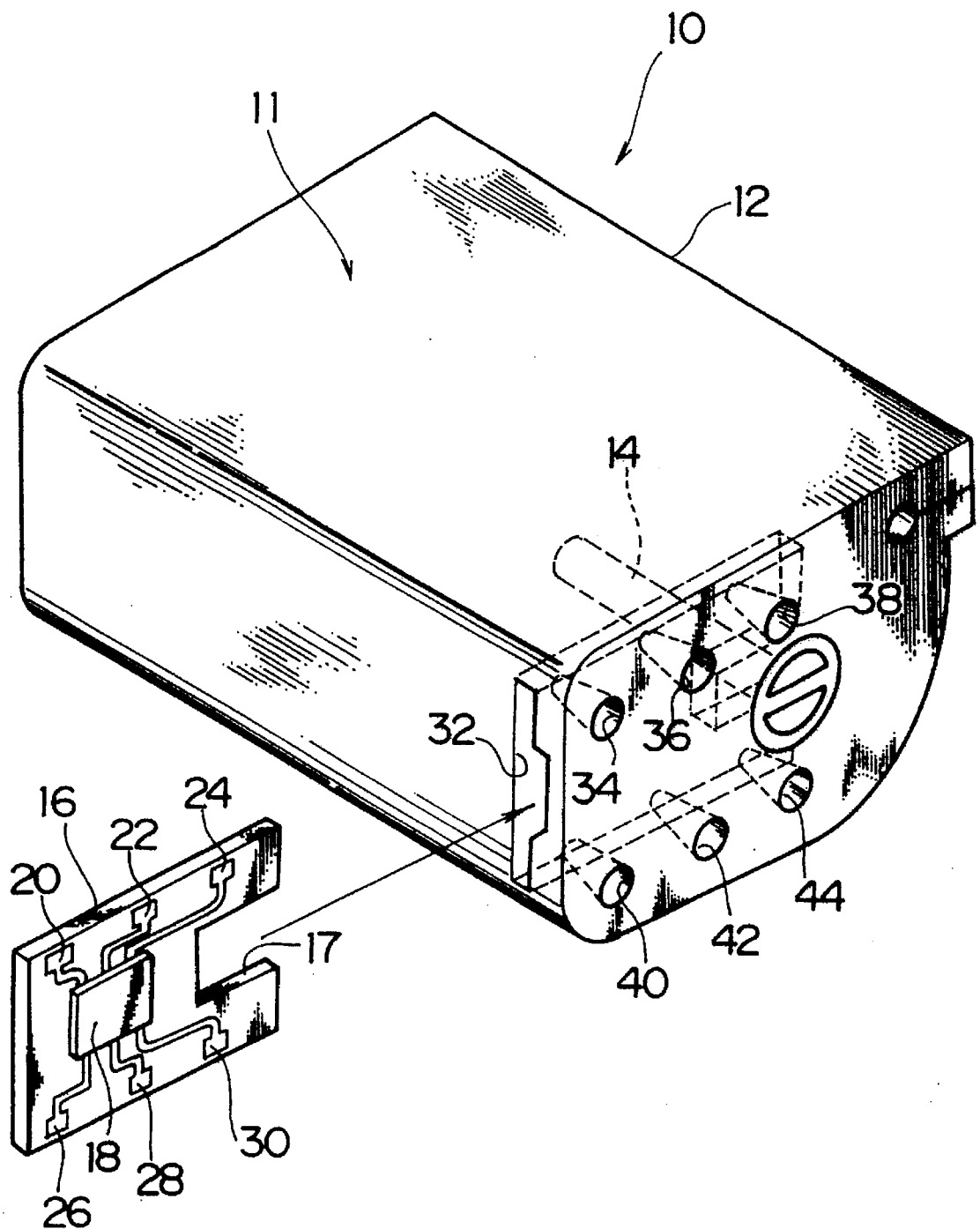
FIG. 1 is a perspective view showing an embodiment of a film cartridge according to the present invention.

FIG. 1 is a perspective view showing embodiments of a film cartridge according to the present invention and an image record unit which is mounted on the film cartridge. An entrance 12 is formed at the front surface of a main body case of the film cartridge 10 for a photo film in a roll which is stored in the main body case, and the photo film is taken in and out through the entrance 12 by rotating a spool axis 14 clockwise/counterclockwise.

An IC substrate 16 for the image record unit is made in a horseshoe-shaped plate, and a non-volatile IC memory chip (electrically erasable/programmable read only memory, hereinunder, called EEPROM ) 18 is fixed to the center thereof. Electrode plates 20, 22, 24, 26, 28, 30 for the EEPROM 18 are fixed at the upper and lower sides of the EEPROM 18. The electrode plate 20 is for read, the electrode plate 22 is for write, the electrode plate 24 is for erase, the electrode plate 26 is for date, the electrode plate 28 is for VCC, and the electrode plate 30 is for GND.

The image signal for each frame image, of which the image quality is adjusted, is recorded so as to correspond to the frame number while printing the developed photo film. Then, a detailed description will be given of the image signal of which the image quality is adjusted. The photo film, which has been completely taken, is carried to a lab together with the film cartridge, and then is taken out from the film cartridge so as to be developed, thereafter, the photo film is adjusted as to the image quality (density correction, tone correction) by a printer with a TV monitor while printing and printed on a printing paper. At this time, the frame image of high quality, of which the image quality has been adjusted, is displayed on the TV monitor of the printer with the TV monitor, and the image signal corresponds to the frame number so as to be recorded in the EEPROM 18, so that the image signal for each frame image, of which the image quality is adjusted, can be recorded in the EEPROM 18.

And, the image signal is outputted from the TV monitor to a work station, and frame images for one photo film are arranged to make a multi-image. The multi-image is outputted by a video printer, whereby an index print sheet for one photo film can be also obtained.

Further, when the image signals for one photo film are recorded in the EEPROM 18, for example in the case of a 24-exposure film, the required capacity of the EEPROM 18 is as follows;

400×225 (picture elements for one frame)×3 (respective color signals)×8 (gradation)=51.84 Mbit. That is, almost 52 Mbit capacity is requested for the EEPROM 18.

Then, the picture elements can be thinned out to ¼ in both the horizontal and vertical directions, so that the capacity of the EEPROM 18 can be reduced as follows;

51.84/(4×4)=3.24 Mbit.

Further, when the 3.24 Mbit information is data-compressed to ¼, the capacity may be 0.81 Mbit. In this embodiment, as described above, the thinned out and compressed image signals are recorded in the EEPROM 18.

On the other hand, a storage part 32 for the IC substrate 16 and plural hole parts 34, 36, 38, 40, 42, 44 for contact pins are made at the side of the main body case 11 of the film cartridge 10. The hole parts 34-44 for contact pins are formed in taper shapes, that is, the diameters thereof become smaller from the side of the main body case 11 to the storage part 32, therefore, contact pins, not shown, can be guided to the electrode plates by the taper surfaces. When the IC substrate 16 is stored in the storage part 32 of the main body case 11 in the direction of the arrow in FIG. 1 (perpendicular to the spool axis 14), the IC substrate 16 is stored in the position of that the spool axis 14 is put in the concave portion where the horseshoe-shaped plate and the electrode plates 20–30 of the IC substrate 16 are exposed at the hole parts 34–44 for contact pins.

Figure 2:
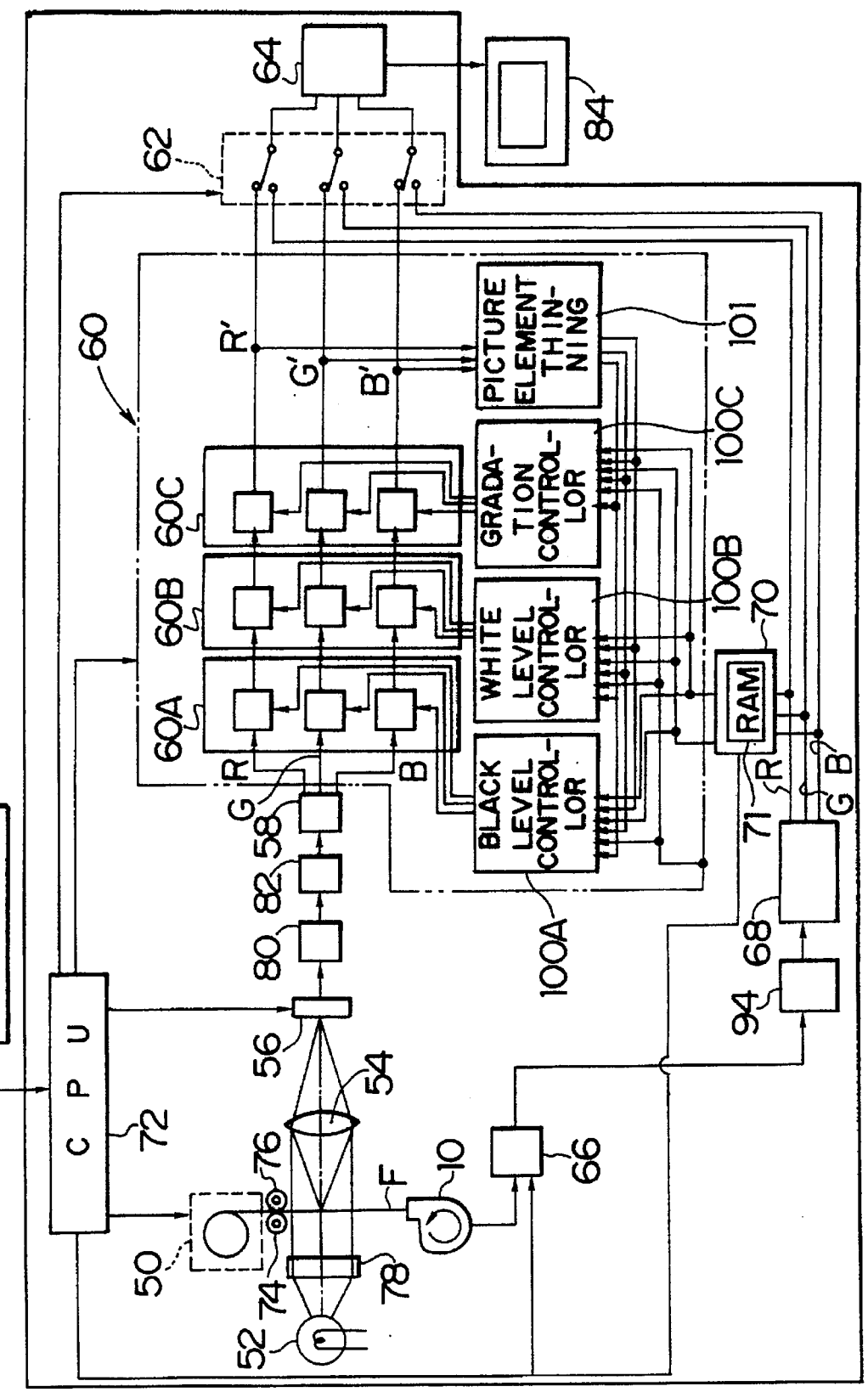
FIG. 2 is a block diagram showing an embodiment of a film image input system according to the present invention.

FIG. 2 is an essential block diagram showing the embodiment of the film image input system according to the present invention. The film image input system is mainly provided with a film driving device for conveying the photo film, a light source 52 for illuminating, a taking lens 54, a CCD area sensor 56, a first color separating circuit 58, a color signal processing circuit 60, a signal changeover switch 62, an encoder 64, an IC memory information reading circuit 66, a second color separating circuit 68, an image selecting circuit 70, a central processing unit (CPU) 72 and the like.

The film driving device 50 includes a film supply part engaged with the spool axis 14 of the film cartridge 10 for driving the spool axis 14 clockwise/counterclockwise, a winding part for winding the photo film F which is fed from the film supply part, and means, which is arranged at the film conveyance path, for conveying the photo film F at a desired speed by putting the photo film F between the capstan 74 and the pinch roller which are driven by a motor. The film supply part drives the spool axis 14 of the film cartridge 10 counterclockwise in FIG. 2 so as to feed the photo film F from the film cartridge 10 until the film top is wound by the film winding part.

The light source 52 illuminates the developed film F, which is taken out from the film cartridge 10, through an infrared light cutting filter 78, and the transmitted light through the film F is focused on the receiving surface of the CCD area sensor through the taking lens 54. The R, G, B voltage signals, which are read out from the CCD area sensor 56 are inputted to a pre-amplifier 80 and amplified, and then a negative image is converted to a positive image by a negative-positive converting circuit 82 and inputted to the first color separating circuit 58. The R, G, B voltage signal, which has been inputted to the first color separating circuit 58, is divided into the respective R, G, B color signals and inputted to the color signal processing circuit. Then, a black level, a white level, and a gradation level, which will be described later, are corrected in the adding circuit 60A, the multiplying circuit 60B and the gamma correction circuit 60C of the color signal processing circuit 60, and the respective R, G, B color signals are converted into the NTSC type image signals by the encoder 64 and outputted to the TV monitor 84. with this arrangement, the film image can be monitored on the TV monitor 84.

Figure 3:
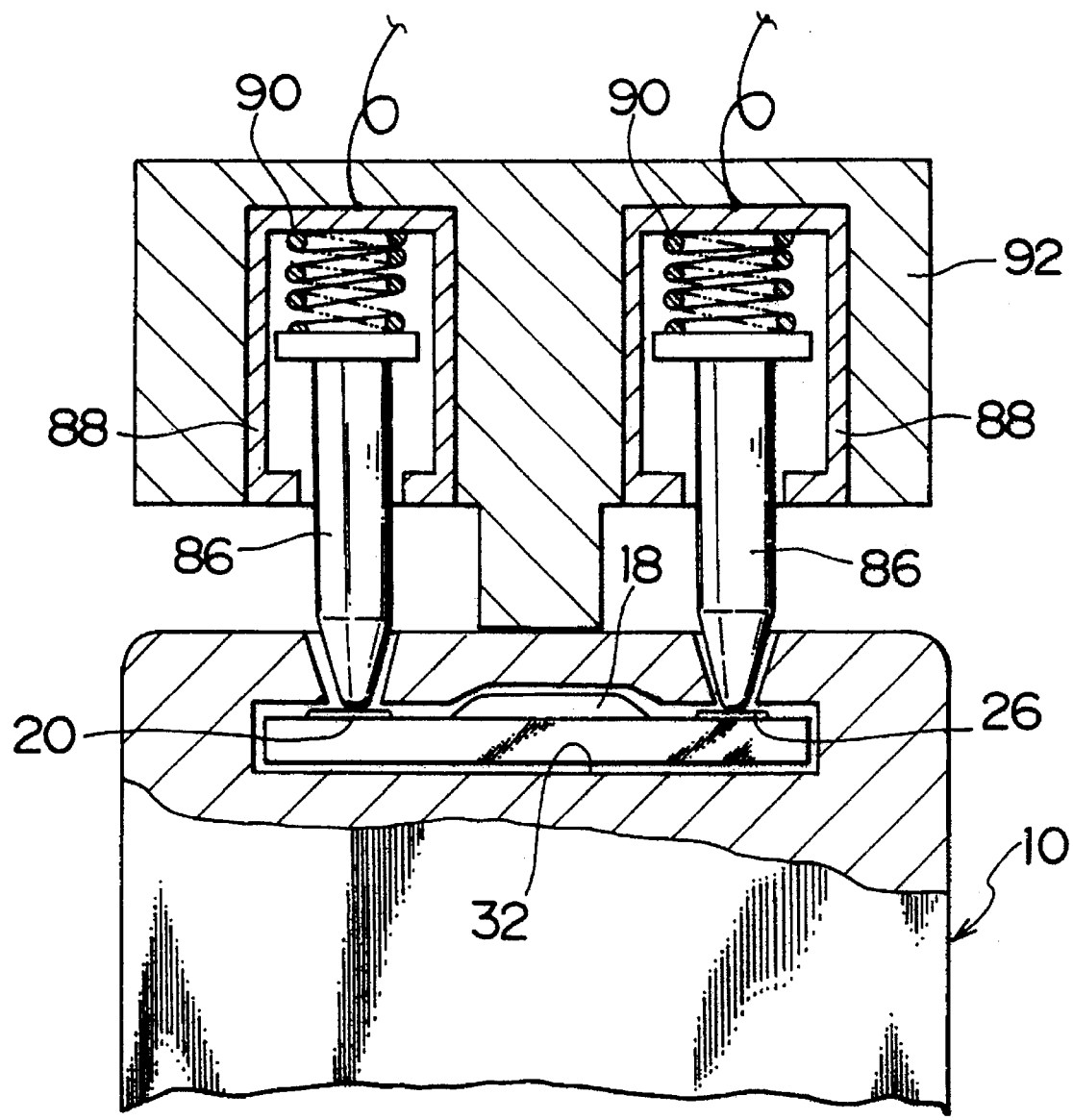
FIG. 3 is a sectional view showing a state in that a contact pin is in contact with an electrode plate of an image record unit.

When the film cartridge 10 is loaded in the film image input system, the IC substrate 16 is connected by the contact pins 86, 86 . . . arranged in the film image input system, as shown in FIG. 3. The contact pin 86 is forced by a conductive spring 90, which is placed in a cylindrical conductive member 88, in the projecting direction from the conductive member 88. And the conductive member 88 is molded in an insulator 92. The film cartridge 10 is loaded, whereby the top ends of the contact pins 86, 86 . . . are guided by the hole parts 34–44 for contact pins so as to be connected with the electrode plates 20–30 of the IC substrate 16.

The contact pin 86, which is connected with the read substrate 20 of the IC substrate 16, is connected to the IC memory information reading circuit 66 shown in FIG. 2, the image signals recorded in the EEPROM 18 are read out by the IC memory information reading circuit 66. The compressed data of the read-out image signals are expanded to the original data by a expanding circuit 94, and then outputted to the second color separating circuit 68. The respective R, G, B color signals, which are separated by the second color separating circuit 68, are outputted to the encoder 64 and displayed on the TV monitor 84 when the signal changeover switch 62 is connected to the second color separating circuit 68, and are outputted respectively to the black level controller 100A, the white level controller 110B and the gradation controller 100C of the color signal processing circuit 60 through the image selecting circuit 70 when the signal changeover switch is connected to the color signal processing circuit 60. And, the respective R, G, B color signals, which are outputted from the gamma correction circuit 60C and thinned out by the picture element thinning out circuit 101, are outputted to the black level controller 100A, the white level controller 100B and the gradation controller 100C, respectively.

Next, an explanation will be given of the operation of the film image input system according to the present invention.

First, the film cartridge 10 is loaded in the film image input system, and the contact pins 86, 86 . . . are connected to the electrode plates 20–30 in the IC substrate 16, respectively. And, a keyboard 102 as an external input device is operated, whereby the signal changeover switch 62 is changed to the second color separating circuit 68 by the CPU 72 and the IC memory information reading circuit 66 is driven. With this arrangement, the image signals of all frames, which are recorded in the EEPROM 18, are image-processed by the encoder 64 and are displayed by compressing them on the TV monitor as a multi-image, and the image signals of all frames are memorized in the memory (RAM) 71 in the image selecting circuit 70 so as to correspond to the frame number.

Then, one frame image is selected among all frame images which are displayed by compressing them on the TV monitor 84, and then the selected frame number is outputted to the CPU by the keyboard 102 and the signal changeover switch 62 is changed to the color signal processing circuit 60 by the CPU 72. When the selected frame number is inputted, the CPU 72 controls the film driving device 50 in a manner that the frame corresponding to the selected frame image is conveyed to the taking position of the CCD area sensor 56, and the image signal corresponding to the frame image is selected by the image selecting circuit 70 and outputted to the color signal processing circuit 60.

Next, an explanation will be given of the color signal processing circuit 60 for correcting the black level, the white level, the medium level and the like.

Figure 4:
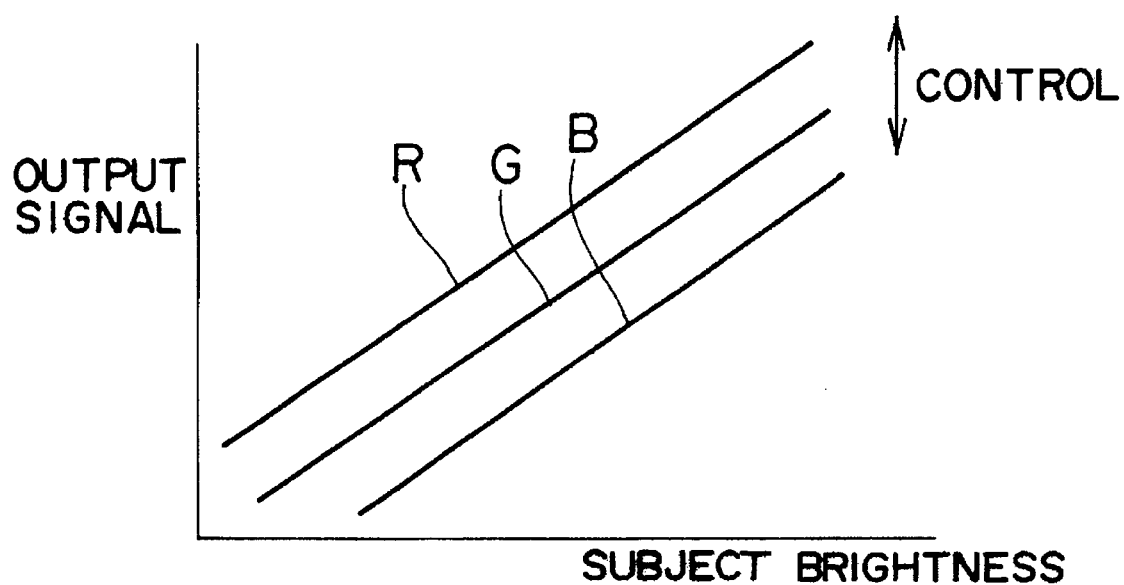
FIG. 4 is an explanatory view showing respective R, G, B signals which are outputted from a color separating circuit to an adding circuit.

First, the black level controller 100A detects reference minimum values of the respective R, G, B color signals based on the image signals from the image selecting circuit 70, and detects minimum values of the respective R, G, B color signals based on the respective R, G, B color signals (see FIG. 4) which are outputted from the gamma correction circuit 60C through the picture element thinning out circuit 101. And, the black level controller 100A compares the reference value and the minimum value and outputs an offset value to the adding circuit 60A so that the minimum value becomes equal to the reference minimum value. Therefore, the respective color signals (see FIG. 5), of which the minimum values are equal to the reference minimum vales, are outputted from the adding circuit 60A to the multiplying circuit 60B.

Figure 5:
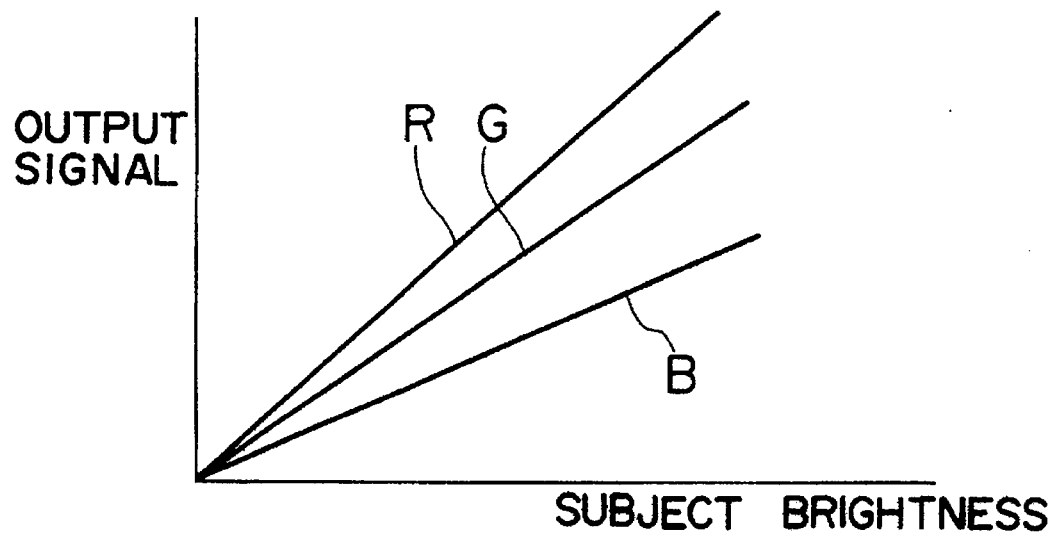
FIG. 5 is an explanatory view showing respective R, G, B signals which are outputted from an adding circuit to a multiplication circuit.

And, the white level controller 100B detects the reference maximum values of the respective R, G, B color signals based on the image signals outputted from the image selecting circuit 70, and detects the maximum values of the respective R, G, B color signals based on the respective R, G, B color signals which are outputted from the gamma correction circuit 60C through the picture element thinning out circuit 101, that is, the color signals shown in FIG. 5. And, the white level controller 100B compares the reference maximum and the maximum value and outputs a gain value to the multiplying circuit 60 B so that the maximum value becomes equal to the reference maximum value. Therefore, the respective color signals (see FIG. 6), of which the minimum value is equal to the reference minimum value and the maximum value is equal to the reference maximum value, which are outputted from the multiplying circuit 60B to the gamma correction circuit 60C.

Figure 6:
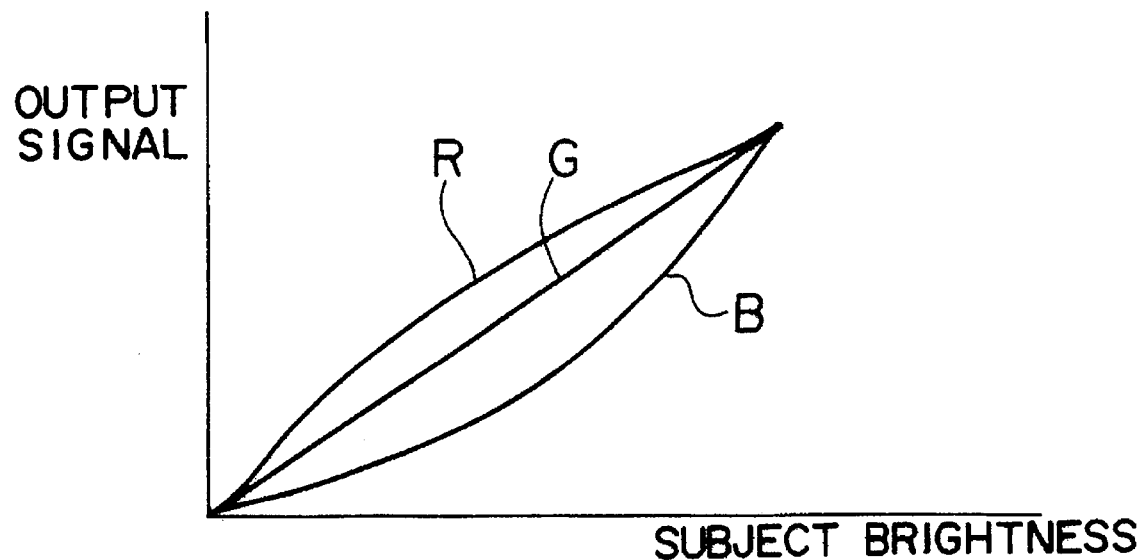
FIG. 6 is an explanatory view showing respective R, G, B signals which are outputted from a multiplication circuit to a gamma correction circuit; and, FIG. 7 is an explanatory view showing respective R, G, B signals which are outputted from a gamma correction circuit to an encoder.
Figure 7:
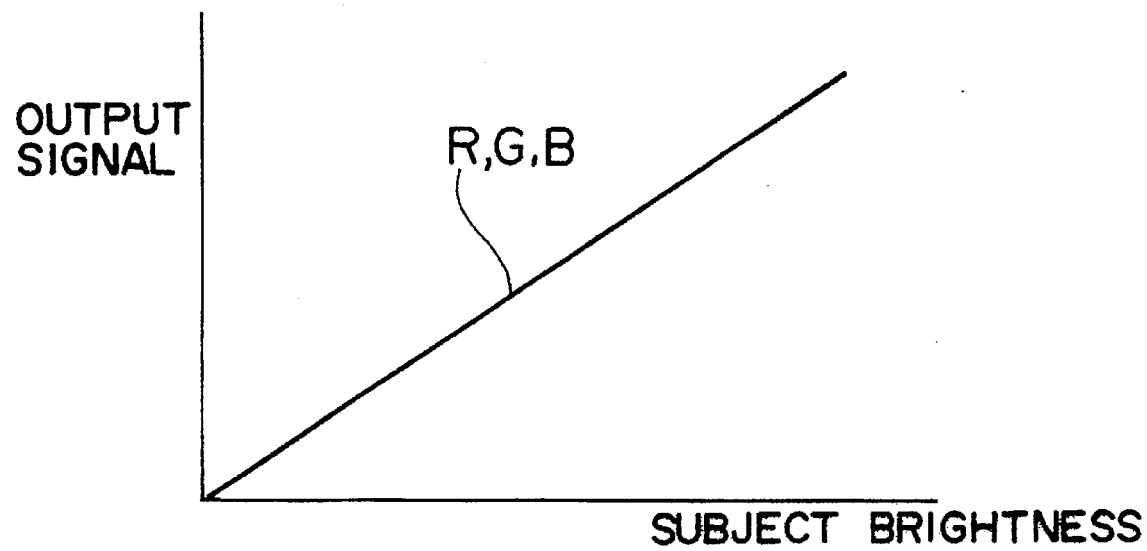

Further, the gradation controller 100C detects the reference medium values of the respective R, G, B color signals based on the image signals outputted from the image selecting circuit 70, and detects the medium values of the respective R, G, B color signals based on the respective R, G, B color signals which are outputted from the gamma correction circuit 60C through the picture element thinning out circuit 101, that is, the color signals shown in FIG. 6. And, the gradation level controller 100C compares the reference medium and the medium value and makes the gamma correction circuit 60C correct the gamma so that the medium value becomes equal to the reference medium value. Therefore, the respective color signals (see FIG. 7), which have the same gradation characteristics as those recorded in the EEPROM 18, are outputted from the gamma correction circuit 60C to the encoder 64, so that a frame image can be obtained of a high quality equal to a printed photograph on the TV monitor 84.

Therefore, according to the film cartridge 10 and the film image input system in this embodiment, if the film cartridge 10 is merely loaded in the film image input system, the frame image of the photo film can be confirmed without imaging the photo film, so that the film cartridge can be looked up easily.

And, according to the film image input system in this embodiment, the black level, the white level and the medium level are set so as to correspond to the image signals recorded in the EEPROM 18, so that the frame image can be obtained on the TV monitor of a higher quality than the conventional film image input system.

Further, in the IC substrate 16 stored in the film cartridge 10, the EEPROM 18 can be read without taking it out from the film cartridge 10, therefore, there is no disadvantage of losing it compared with the conventional image record unit which is taken out from the film cartridge whenever reading.

In this embodiment, the image signals are recorded in the EEPROM 18 for monitoring a multi-image on the TV monitor 84, however, the present invention should be not limited to this. For example, in a film image input system in which no multi-image is displayed, the EEPROM 18 may record the reference minimum values, the reference maximum values and the reference medium values for the respective frames.

In this film image input system, the image selecting circuit 70 records the reference minimum values, the reference maximum values and the reference medium values of the respective R, G, B color signals for the respective frames. And, the black level controller 100A detects reference minimum values of the respective R, G, B color signals based on the respective R, G, B color signals outputted from the gamma correction circuit 60C and outputs an offset value to the adding circuit 60A so that the minimum value becomes equal to the reference minimum value outputted from the image selecting circuit 70.

And, the white level controller 100B detects reference maximum values of the respective R, G, B color signals based on the respective R, G, B color signals outputted from the gamma correction circuit 60C and outputs an gain value to the multiplying circuit 60B so that the maximum value becomes equal to the reference maximum value outputted from the image selecting circuit 70.

Further, the gradation controller 100C detects reference medium values of the respective R, G, B color signals based on the respective R, G, B color signals outputted from the gamma correction circuit 60C and the gamma is corrected so that the medium value becomes equal to the reference medium value outputted from the image selecting circuit 70. With this arrangement, the image signals (see FIG. 7), which have the same reference minimum value, reference maximum value and the reference medium value as those stored in the EEPROM 18, are outputted to the encoder 64, so that a high quality image can be obtained on the TV monitor 84 by reading the image only once.

As described above, according to the film cartridge of the present invention, the image signal of each frame image is recorded in the image record unit so as to correspond to the frame number and the image signal is read and displayed, whereby an index image of the photo film can be obtained. Therefore, in this invention, a film cartridge can be looked up easily, and the image signal is that of the image of which the quality is adjusted while printing the photo film, so that an image can be obtained of a high quality equal to a printed photograph while the frame image is reproduced.

And, according to the film cartridge of the present invention, the image record unit is stored in the storage part of the film cartridge at a position where the concave portion of the horseshoe-shaped image record unit holds the spool axis of the film cartridge and the electrode plate in the image record unit exposes the hole parts for the contact pins, so that the image record unit can be used while being stored in the film cartridge without taking it out from the film cartridge. Therefore, the film cartridge can be kept from being lost from the image record unit.

Further, according to the film image input system, the adding means, the multiplying means and the gamma correction means are respectively controlled base on the image signals which are respectively outputted to the black level controller, the white level controller and the gradation controller, and the gamma correction means outputs the respective R, G, B color signal of the maximum value equal to the reference maximum value, the respective R, G, B color signal of the minimum value equal to the reference minimum value, and the respective R, G, B color signal of the medium value equal to the reference medium value, so that an image can be obtained of a high quality equal to a printed photograph while the frame image is reproduced.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A film image input system employing a film cartridge in which a developed photo film of a long band is stored in a roll and an image record unit is mounted, and an image signal of each frame image, of which an image quality is adjusted when said photo film is printed, is recorded in said image record unit so as to correspond to a frame number; said film image input system comprising:

film conveyance means for rewinding said photo film from a film cartridge and conveying;

a light source for illuminating said photo film which is conveyed by said film conveyance means;

imaging means for imaging a transmitted image of a frame in said photo film which is illuminated by said light source;

adding means for adding respective red, green and blue offset values to red, green and blue signals which are out-putted from said imaging means;

multiplying means for multiplying respective red, green and blue gain values by respective red, green and blue signals which are outputted from said adding means;

gamma correction means for gamma correcting said respective red, green and blue signals which are outputted from said multiplying means;

image signal selecting means for selecting and outputting an image signal of said frame which is recorded in said image record unit in corresponding to a frame number of a frame, which is imaged by said imaging means;

a black level controller for detecting reference minimum values of respective red, green and blue signals based on an image signal selected by said image signal selecting means and minimum values of respective red, green and blue signals based on said respective red, green and blue signals which are outputted from said gamma correction means, and for outputting offset values to said adding means so as to correspond said minimum values to said reference minimum values;

a white level controller for detecting reference maximum values of respective red, green and blue signals based on an image signal selected by said image signal selecting means and maximum values of respective red, green and blue signals based on said respective red, green and blue signals which are outputted from said gamma correction means, and for outputting gain values to said multiplying means so as to correspond said maximum values to said reference maximum values; and, a gradation controller for detecting reference medium values of respective red, green and blue signals based on an image signal selected by said image signal selecting means and medium values of respective red, green and blue signals based on said respective red, green and blue signals which are outputted from said gamma correction means, and for making said gamma correction means gamma-correct so as to correspond said medium values to said reference medium values.

2. The film image input system as set forth in claim 1, wherein a switch is provided for changing over a signal to be outputted to a TV monitor between a first signal outputted from said gamma correction means and a second signal outputted from said image record unit, and said signal is changed to said second signal, whereby frame images of plural frames, which are recorded in said image record unit, are displayed; and said film image input system comprises image selecting means for selecting an image of one frame among said frame images of said plural frames which are displayed, and control means for controlling said film conveyance means based on frame image, which is selected by said image selecting means, so that a frame corresponding to said frame image can be photographed, and for switching said switch to the first signal side.

3. A film image input system employing a film cartridge in which a developed photo film of a long band is stored in a roll and an image record unit is mounted, and a reference minimum value, a maximum value and a reference medium value for respective red, green and blue signals of each frame image, of which an image quality is adjusted when said photo film is printed, are recorded in said record unit so as to correspond to a frame number; said film image input system comprising:

film conveyance means for rewinding said photo film from a film cartridge and conveying;

a light source for illuminating said photo film which is conveyed by said film conveyance means;

imaging means for imaging a transmitted image of a frame in said photo film which is illuminated by said light source;

adding means for adding respective red, green and blue offset values to red, green and blue signals which are outputted from said imaging means;

multiplying means for multiplying respective red, green and blue gain values by respective red, green and blue signals which are outputted from said adding means;

gamma correction means for gamma correcting said respective red, green and blue signals which are outputted from said multiplying means;

image signal selecting means for selecting and outputting a reference minimum value, a reference maximum value and a reference medium value which are recorded in said image record unit in corresponding to a frame number of a frame, which is imaged by said imaging means;

a black level controller for detecting minimum values of respective red, green and blue signals based on an image signal outputted from said respective red, green and blue signals, and for outputting offset values to said adding means so as to correspond said minimum values to said reference minimum values of said respective red, green and blue signals, which are selected by said image signal selecting means;

a white level controller for detecting maximum values of respective red, green and blue signals based on said respective red, green and blue signals which are outputted from said gamma correction means, and for outputting gain values to said multiplying means so as to correspond said maximum values to said reference maximum values which are selected by said image signal selecting means; and, a gradation controller for detecting medium values of respective red, green and blue signals based on said respective red, green and blue signals which are outputted from said gamma correction means, and for making said gamma correction means gamma-correct so as to correspond said medium values to said reference medium values of said respective red, green and blue signals which are selected by said image signal selecting means.

* * * * *